United States Patent [19]

Stark

[11] Patent Number: 5,482,150
[45] Date of Patent: Jan. 9, 1996

[54] BUSHED OVERRUNNING CLUTCHES

[75] Inventor: Johann Stark, Aisch, Germany

[73] Assignee: Ina Walzlager Schaeffler KG, Germany

[21] Appl. No.: 452,095

[22] Filed: May 26, 1995

Related U.S. Application Data

[63] Continuation of Ser. No. 36,027, Mar. 23, 1993, abandoned.

[30] Foreign Application Priority Data

Mar. 31, 1995 [DE] Germany .................... 42 10 560.9

[51] Int. Cl.⁶ ............................................. F16D 41/06
[52] U.S. Cl. ............................................. 192/45; 384/572
[58] Field of Search ............................ 192/45, 41 R, 192/44; 188/82.84; 384/523, 526, 539, 572, 584, 585, 614, 617

[56] References Cited

U.S. PATENT DOCUMENTS

| | | | |
|---|---|---|---|
| 2,973,847 | 3/1961 | Stockton | 192/45 |
| 3,620,640 | 6/1974 | Marola et al. | 192/45 |
| 3,691,854 | 9/1972 | Barthruff et al. | 192/45 X |
| 3,975,066 | 8/1976 | Hofmann et al. | 384/526 |
| 4,296,979 | 10/1981 | Hofmann et al. | 384/562 X |
| 4,451,098 | 5/1984 | Farley et al. | 384/526 |
| 4,523,862 | 6/1985 | Yasui et al. | 384/572 X |
| 4,989,705 | 2/1991 | Kashio et al. | 192/45 |
| 5,048,651 | 9/1991 | Lederman | 384/572 X |
| 5,117,954 | 6/1992 | Iga | 192/45 |
| 5,156,246 | 10/1992 | Iga et al. | 192/45 |
| 5,273,144 | 12/1993 | Papania | 192/45 |
| 5,387,041 | 2/1995 | Lederman | 384/526 X |

FOREIGN PATENT DOCUMENTS

| | | | |
|---|---|---|---|
| 965360 | 4/1975 | Canada | 192/45 |
| 469-599 | 2/1992 | European Pat. Off. | 192/45 |
| 2136364 | 2/1973 | Germany | 384/572 |
| 3345-827 | 6/1985 | Germany | 192/45 |
| 2080889 | 2/1982 | United Kingdom | 384/572 |
| 2218750 | 11/1989 | United Kingdom | 384/572 |

*Primary Examiner*—Andrea L. Pitts
*Attorney, Agent, or Firm*—Bierman and Muserlian

[57] ABSTRACT

An overrunning clutch (1) provided with a bushing (2) which is open at one end and partially closed at the opposite end and into which are inserted firstly a cage (5) guiding latching needles (3) and comprising at least one flange and clutch springs (4), and secondly a slide ring (6) arranged on one end of the cage (5), the axial width of the bushing (2) overlapping the cage (5) and the slide ring (6), characterized in that the flange (9) of the cage (5) is positively and releasably coupled with a flange (13, 13d) of the bushing (2).

28 Claims, 5 Drawing Sheets

BUSHED OVERRUNNING CLUTCHES

PRIOR APPLICATION

This application is a continuation of U.S. patent application Ser. No. 036,027 filed Mar. 23, 1993, now abandoned.

Overrunning clutches of small dimensions are used in the communications field such as in copier or telefax machines. DE-OS 39 14 120 describes an overrunning clutch wherein a closing member in the form of an annular disk substantially closes the opening of the bushing, and on which the clutch springs as well as so-called stop elements for the latching needles are arranged on one side, which in the installed state of the closing member are disposed axially and concentric with the longitudinal axis of the clutch. The latching needles are guided in a separate outer ring which is inserted non-rotationally in a cylindrical section which embraces the outer ring and the closing member. This construction requires much manual labor for assembly and disassembly and therefore is cost-intensive. Furthermore, this construction has the design-related disadvantage that it takes up much space radially and axially, resulting inter alia in the disadvantage of a limited length of the latching needles relative to the width of the clutch.

Another clutch design is shown in DE-OS 33 45 827 where the cage guiding the latching needles is axially fixed by an end region of the bushing which is crimped over at both ends. The bushed overrunning clutch represented in various designs, is provided according to FIG. 3 with a slide ring at both ends of the cage, resulting in the disadvantage of a large width relative to the length of the latching needles. The crimping at both ends further causes a high manufacturing cost and this design does not permit a complete and nondestructive disassembly of the clutch.

OBJECTS OF THE INVENTION

It is an object of the invention to provide a compact overrunning clutch which can be produced with fewer operations in a cost-effective manner and can be disassembled without destruction.

This and other objects and advantages of the invention will become obvious from the following detailed description.

THE INVENTION

The novel overrunning clutch of the invention provided with a bushing (2) which is open at one end and partially closed at the opposite and and into which are inserted firstly a cage (5) guiding latching needles (3) and comprising at least one flange and clutch springs (4), and secondly a slide ring (6) arranged on one end of the cage (5), the axial width of the bushing (2) overlapping the cage (5) and the slide ring (6), is characterized in that the flange (9) of the cage (5) is positively and releasably coupled with a flange (13, 13d) of the bushing (2).

In another embodiment of the invention, the overrunning clutch (31) provided with a bushing (32) which is open at one end and into which are inserted firstly a cage (35) guiding latching needles (33) and comprising at least one flange and clutch springs (34), and secondly a slide ring (36), the axial width of the bushing (32) overlapping the cage (35) and the slide ring (36), is characterized in that the bushing (32) has a closed bottom (47) and the cage is axially fixed by the slide ring (36) which is releasably inserted in the bushing (32).

The clutches of the invention have a cage construction coupled to the flange of the bushing, i.e. to the partially closed end of the bushing by a releasable, positive connection. It is possible for the clutch to have a bushing open at one end only with the opposite end having a closed bottom. The cage of this clutch is fixed axially by a slide ring inserted laterally into the bushing in a releasable manner.

The bushed overrunning clutches of the invention are particularly useful for clutches of small dimensions as they have an improved ratio of the width of the latching needles to the total clutch width, i.e. to the dimension of the clutch in the axial direction, and they permit the cage to be secured and fixed in a minimum of space simply and effectively. What both solutions have in common is that the crimping of the bushing is dispensed with. Heretofore, this operation was necessary after insertion of the cage to fix the cage. The solutions optimize the cost of manufacture in providing advantageously small dimensions without influencing the transmissible torque of the bushed overrunning clutch, particularly a clutch mounted in bearings.

The construction of the invention has the further advantage that the clutch can be disassembled without destruction and hence parts can be re-used or worn parts replaced. In addition, the invention allows a simple separation of materials thus taking into account also the demand for recyclability of materials.

In a variant of the invention, the cage is provided with flanges on both sides of the latching needles and either one flange is coupled directly with the sleeve, or fixing is achieved by the laterally abutting slide ring. The construction of the clutch further provides, independently of the fixing of the cage, a slide ring which is inserted into the fully open end of the bushing.

In another variant of the invention, a sintered metal is used as the material for the slide ring instead of the customary bronze material. This material, formed by the baking together of powder materials, makes it possible to select a material composition adapted to the loading of the slide ring so as to be able to achieve an optimum with regard to wear, emergency running properties and costs.

For the insertion of the slide ring into the bushing, the invention provides that the ring is fitted into the bushing releasably. Advantageously, the slide ring is snapped onto the bushing or screwed to it directly or indirectly.

In a further advantageous variant of the invention, the flange directed toward the fully open end of the clutch has a projection which overlaps the slide ring axially and radially and thus bridges the radial distance between the slide ring and the bushing. At its end, the projection comprises snap lugs oriented radially inward in the direction of the longitudinal axis of the clutch and fitted into corresponding recesses on the slide ring, which lugs are arranged all around or on some parts of the periphery and provide for a positive retention of the slide ring.

The projection is preferably further provided with integrally formed portions extending locally radially on the outer periphery over the entire axial width and bearing against the bushing. This design advantageously assures a damping of vibrations which occur in override operation of the clutch, but which must not affect adjacent elements of the clutch. Advantageously, the integrally formed portions bring about a desired pre-tension, by which a secure retention of the slide ring in the clutch is assured.

In the invention, the projection may further be provided with local axial recesses in its end region, which serve for example for simplified seating of the projection and of the cage including the latching needles lodged therein. Further, these recesses are advantageously suitable for compensating tolerances in clutches subjected to high thermal load.

Preferably, the clutch is provided with a seal against issuing lubricant and/or intruding contaminants. This seal, particularly a lubricant seal, may, depending on the use of the clutch, be designed contactless, i.e. have a seal gap, or be designed as a contacting, i.e. friction seal. It is also possible to provide different seals-i.e. contacting and not contacting-on the different flanges concerned.

Another advantageous variant provides for an opening or recess in the flange of the cage which is arranged adjacent to the slide ring whereby it can be assured that the lubricant can get from the lubricant-filled latching needle cavity to the slide ring. To produce a cost-effective clutch, the bushing is formed without chip removal and provided on its outer periphery with a torque transmission means also integrally formed chiplessly, whereby the clutch can for example be pressed into a housing, particularly a plastic housing, non-rotationally. The bushing is advantageously shaped so that the clutch does not require a predetermined direction of installation, so that it is usable for both directions of roatation, by preselection of the installed position.

In a further variant, the cage of the clutch is provided with integrally injection-molded clutch springs, which correspond to the geometric form of the letter J and are disposed axially on the flange to point toward the center of the cage. The free ends, i.e. the angularly bent short legs of the clutch springs are formed so that they end in the central region of the cage whereby a desired effective spring support of the latching needles and hence a high efficiency of the clutch are assured.

To realize a positive coupling of the cage to the flange of the sleeve in the axial direction, a snap engagement is provided which preferably has several pre-tensioning elements distributed over the circumference and extending from the flange of the cage substantially axially in the direction of the bushing flange. On the ends of the pre-tensioning elements, cams are provided which in the installed position engage behind the flange or partial regions of the bushing flange. Alternatively, the snap engagement may be designed as an annular bead which has several divisions and the end zone of which bead likewise engages behind partial regions of the bushing flange. The annular bead advantageously assures a snap engagement of higher strength and, advantageously, this snap engagement does not exceed the outer contour of the clutch.

The design of the snap engagement provides for differently arranged cams, that is, they can protrude into local recesses directed radially outward or into a peripheral groove on the flange of the bushing. Alternatively, in clutches with a bottom provided in the direction of the cage, the cams may be arranged radially in the direction of the longitudinal axis of the clutch, the pre-tensioning elements being inserted through openings in the arched bottom to engage behind the latter.

To achieve an additional reduction of the overall dimensions, the cage is designed as a one-flange cage having no flange at its end toward the bushing flange, and the axial fixing of the cage is effected by the slide ring. An advantageous design provides for a one-flange cage where the flange assumes at the same time the function of the slide ring and is integrally formed. This dimensionally optimized solution assures a large latching needle length with unchanged external dimensions of the clutch. Also envisaged is a clutch not equipped with a slide ring, where for example a laterally arranged radial rolling bearing effects the centering between the rotationally driving and driven parts.

Referring to the drawings.

Figure 1:
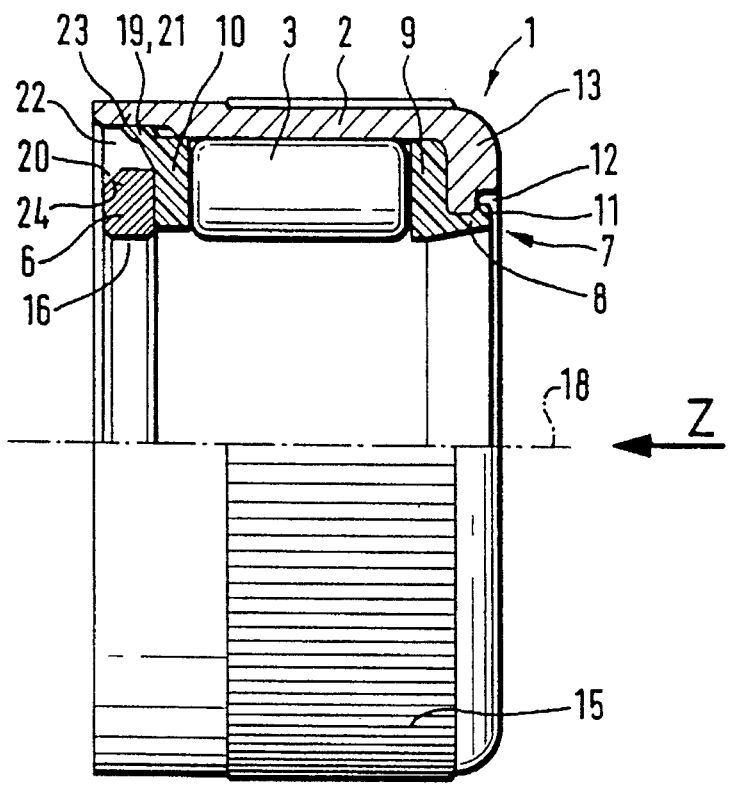
FIG. 1 is a side view in half-section, of a bushed overrunning clutch of the invention where the cage is snapped onto the flange of the bushing.

In FIG. 1, a clutch 1 has a bushing 2 fully open at one end and substantially open at the opposite end, in which a cage 5 guiding latching needles is inserted, and whose flanges 9, 10 arranged on either side of the latching needles 3 are represented. The cage 5 possesses an axial securing means in the form of a snap engagement 7, by which it is coupled to the bushing 2. The snap engagement 7 is provided with pre-tensioning elements 8 extending horizontally from the bushing 2, on the ends of which elements cams 11 directed radially outward are provided which, in the installed state, protrude into a recess 12 on the flange 13 of the bushing 2. The flange 10 situated opposite the snap engagement 7 on the cage 5 is provided with a projection 19 which covers the slide ring 6 radially and axially, the latter having integrally formed portions 21 on some parts of its outer circumference, which portions extend over the entire axial width of the projection 19 and protrude into an offset 23 which is arranged extending radially outward in an end region of the bushing 2. Further, the projection 19 is provided in an end region with several recesses 22 extending axially over the entire axial width thereof and arranged preferably symmetrically around the periphery of the projection 19. In alternation with the recesses 22, the projection 19 is also provided on the inner side with snap lugs 20 not shown in FIG. 1, extending radially in the direction of the longitudinal axis 18, which lugs in the installed state engage behind the slide ring 6 and lock into a chamfer 24 of the slide ring 6. As shown in the bottom part of FIG. 1, the bushing 2 is provided on the outer circumference with a knurl 15, which serves as a torque transmission means, and which advantageously does not extend over the entire axial width.

Figure 2:
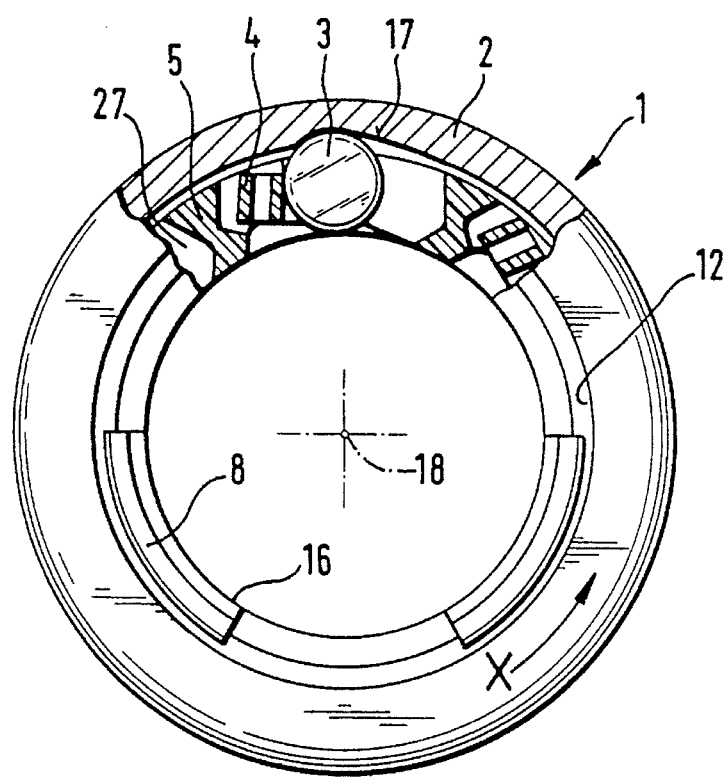
FIG. 2 is a front view of the bushed overrunning clutch of FIG. 1.

FIG. 2 shows the clutch of FIG. 1 in front view in arrow direction Z to illustrate the construction of the cage 5. The cage 5, inserted into the bushing 2, serves to receive and guide the latching needles 3, which bridge the radial distance between a shaft (not shown in FIG. 2) introduced into the bore 16, and the inner face of the bushing 2. To achieve torque transmission by the clutch 1, a direction of rotation of bushing 2 in the arrow direction X is required, that is, the bushing 2 must move contrary to the shaft inserted in the bore 16, in other words, a relative movement between the bushing 2 and the shaft is required (override coupling effect). To this end, the latching needles roll on obliquely directed clamping surfaces 17, which, made in the bushing 2, continuously reduce the radial distance from the opening 16 and hence from the shaft and bring about a clamping effect. The cage 5 also comprises clutch springs 4 integrally formed thereon and applied to the latching needles 3 on one side. Further, the cage 5 is provided with several latching element cavities 27, into which a lubricant can be introduced when installing the clutch to assure a long-term operation of the clutch. To assure lubrication of the slide ring 6, the flange 10 comprises an opening through which the lubricant can get to the slide ring 6 in a controlled manner. Alternatively, a radial recess may be provided on the inner side of the flange 10 for the lubrication of the slide ring 6.

Figure 3:
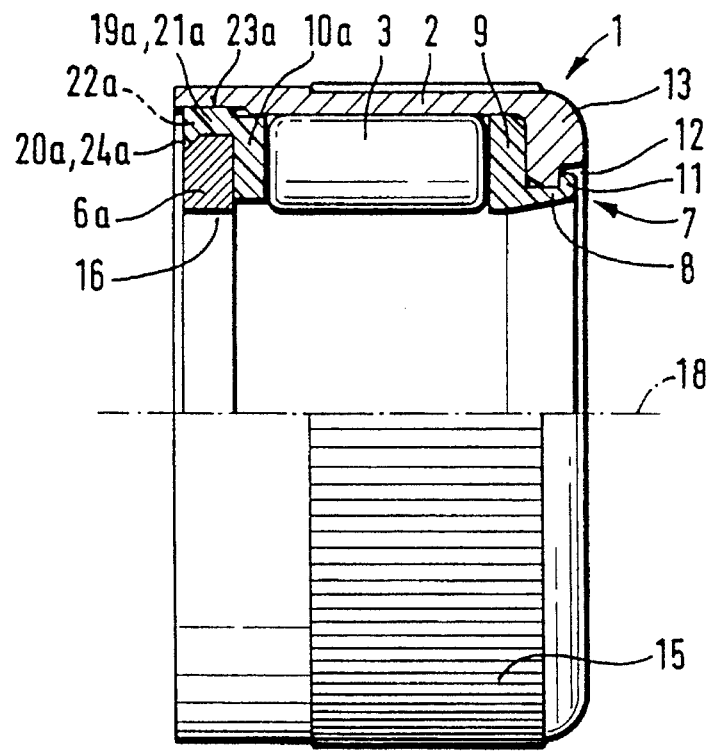
FIG. 3 is a side view in a half-section of a bushed overrunning clutch with a slide ring arranged and dimensioned differently from the clutch of FIG. 1.
Figure 4:
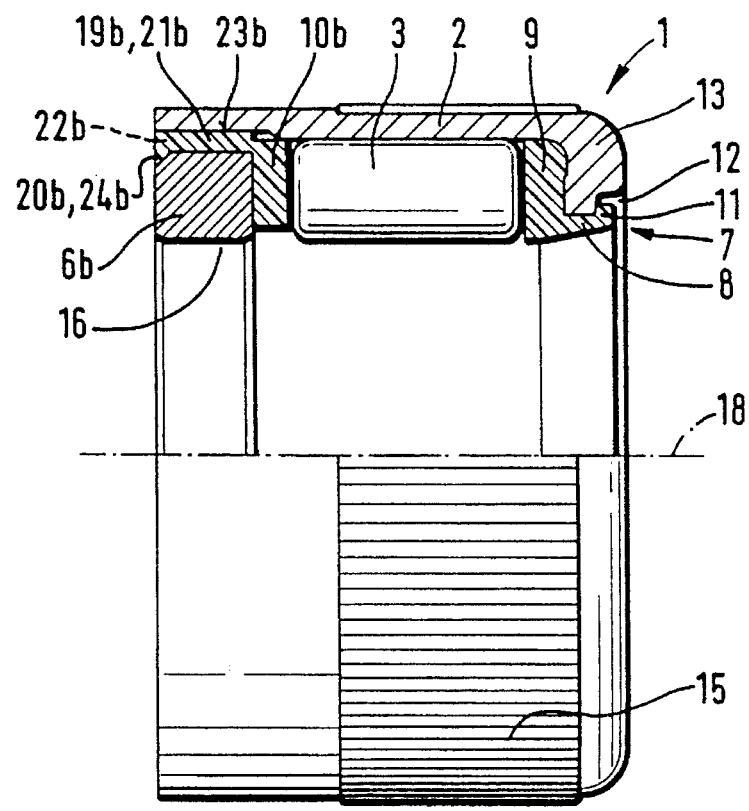
FIG. 4 is a side view in a half-section of a bushed overrunning clutch where the flange is provided with a projection which covers the adjacent slide ring axially and radially.
Figure 5:
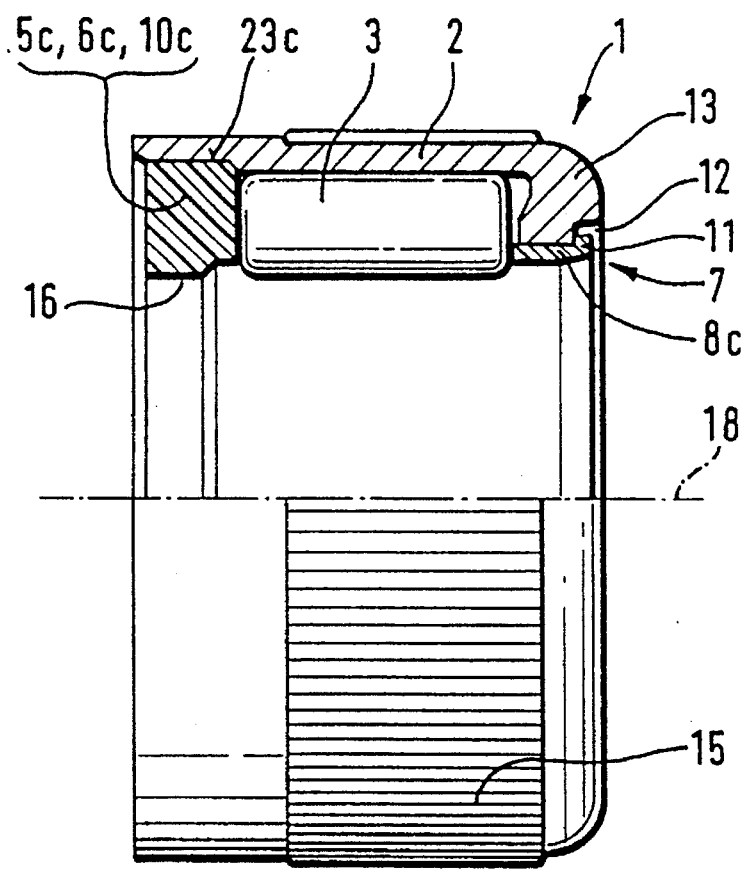
FIG. 5 is a side view in a half-section of a bushed overrunning clutch provided with a one-flange cage.

FIGS. 3, 4 and 5 show alternative embodiments of the clutch 1 of FIG. 1, which are limited exclusively to the arrangement and design of the slide ring and the elements directly adjacent thereto. Like elements are marked in all additional figures with the same references. Elements of a design differing from FIG. 1 are provided with supplementary identification.

Differing from FIG. 1, the slide ring 6a of FIG. 3 is given a larger outer diameter with the result that the projection 19a bridging the radial distance between the slide ring 6a and the bushing 2 is dimensioned smaller, that is, it has a smaller wall thickness. Despite the altered design space, the projection is likewise provided with integrally formed portions 21a which project into the offset 23a, as well as with snap lugs 20a which engage into the chamfer 24a and are arranged in alternation with the recesses 22a in an end region of the projection 19.

In FIG. 4, a slide ring 6b is shown in which in contrast to FIGS. 1 and 3, has a clearly larger axial extent. As in the prior FIGS., the projection 19b extends over the entire axial width of the slide ring 6b, is made in one piece with the flange 10 and has integrally formed portions 21b which are coaxial with the longitudinal axis 18 and project into the offset 23b. The snap lugs 20b situated in an end region of the projection 19b are flush with the end faces of the bushing 2 and of the slide ring 6b and in the installed state they protrude into the chamfer 24b. The embodiment of FIG. 4 likewise permits the formation of recesses 22b which serve for compensating tolerances.

A further alternative is shown in FIG. 5 wherein to increase the axial length of the latching needles 3, the clutch 1 is provided with a one-flange cage. The cage 5c has only one flange 10c which serves at the same time as a slide ring 6c which is releasably fitted into the offset 23c of the bushing 2 at the fully open end thereof. On the side opposite flange 10c, the latching needles 3 are guided axially by the flange 13 of the bushing 2, the cage 5c being provided with pre-tensioning elements 8c having cams 11 which protrude into a recess 12 of the bushing flange 13 and jointly form the snap engagement 7c.

Figure 6:
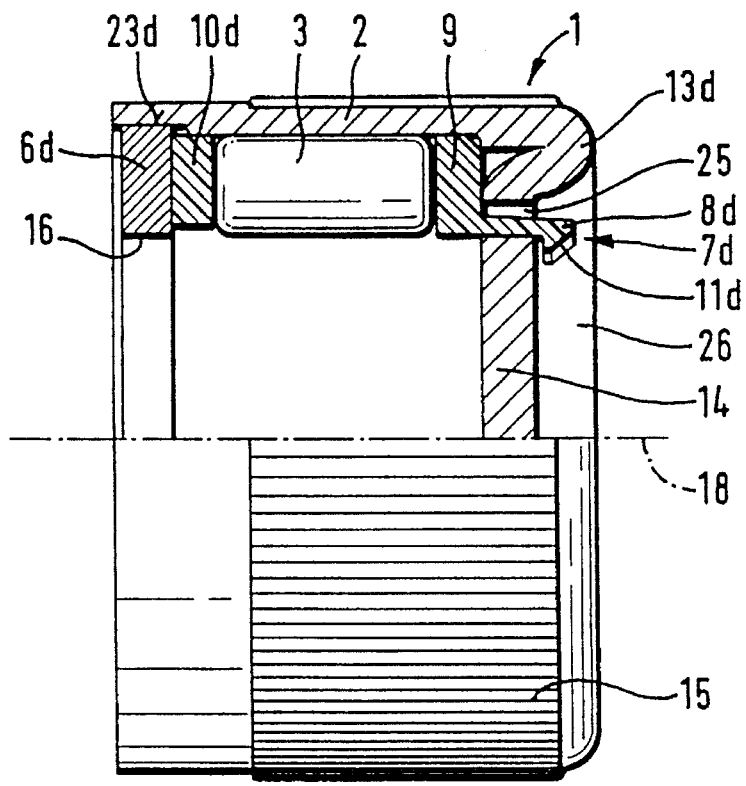
FIG. 6 is a side view in a half-section of a bushed overrunning clutch where the cage is snapped onto the inwardly arched flange of the bushing.

In FIG. 6, the bushing 2 is provided with a flange 13d, which has contiguous to it a bottom 14, which has a crank or camber in the direction of the latching needles 3 to create a cavity 26. The snap engagement 7d is formed by the pre-tensioning elements 8d which are introduced through openings 25 in the bottom 14 and provided in an end region with cams 11d which, extending radially inward in the direction of the longitudinal axis 18, engage locally behind the bottom 14 to axially secure the flange 9 which is connected with the cage. In contrast to FIGS. 1, 3 and 4, the flange 10d is not provided with a projection. The slide ring 6d is releasably inserted in the offset 23d, for example by screwing, and consequently bridges the entire radial distance between the opening 16 and the bushing 2.

Figure 7:
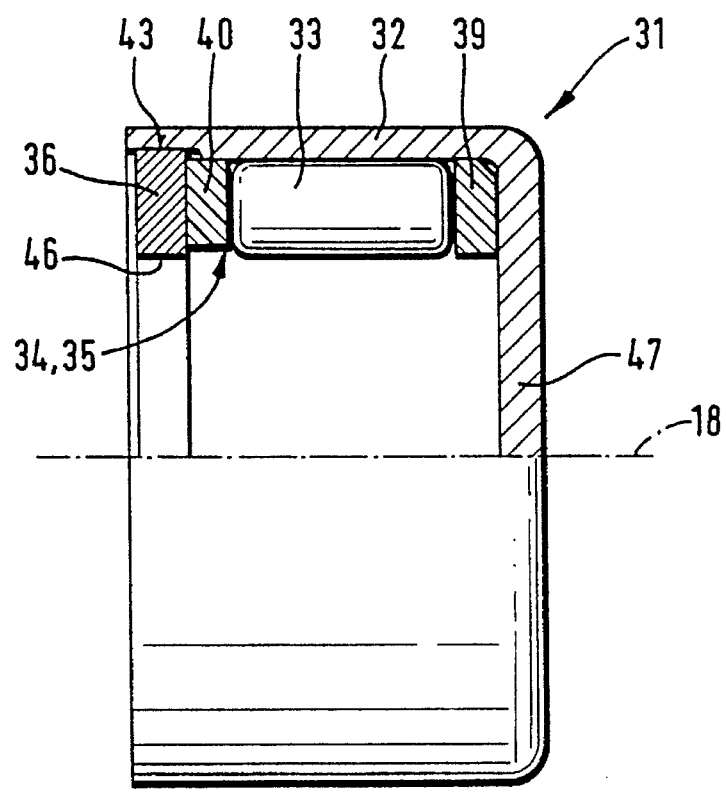
FIG. 7 is a side view of a bushed overrunning clutch which is open only at one end, and in which the cage is axially fixed by the laterally arranged slide ring.

In FIG. 7, the clutch 31 is provided with the bushing 32 which has a fully closed bottom 47 and therefore is open only at one end. The cage 35 which serves to receive the latching needles 33 and is laterally connected with the flanges 39, 40 is provided with an axial securing means in the form of the slide ring 36, which is releasably fitted in the offset 43 of the bushing 32 and bridges the distance between the opening 46 and the bushing 32.

Figure 8:
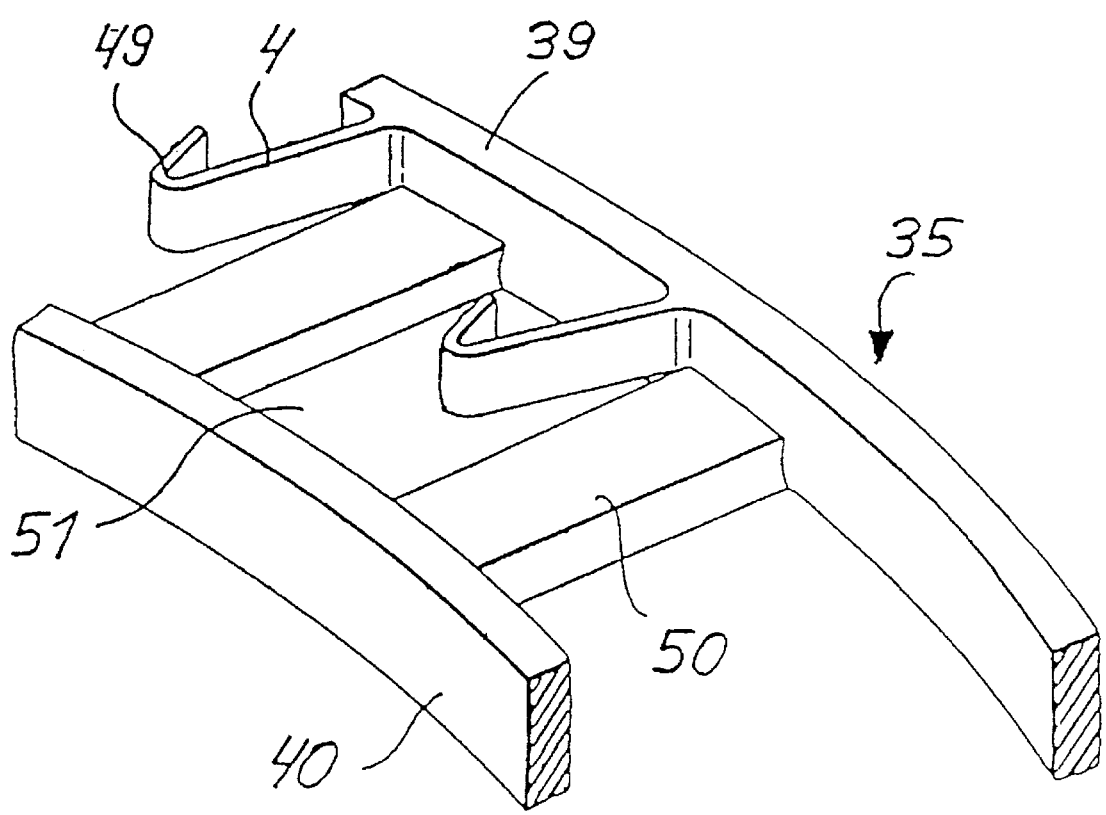
FIG. 8 is a perspective view of the cage (35) which can be inserted into an overrunning clutch 31 (FIG. 7).

In FIG. 8, the flanges (39,40) which are concentric with the longitudinal axis (18) of the overrunning clutch (31) are connected to each other. J-shaped clutch springs (4) integerally provided on the flange (39) are disposed in free spaces between the flanges (39,40). In the assembled state, the angularly bent free ends (49) of the J-shaped clutch springs (4) bear against the latching needles (33) while exerting a spring force thereon.

Various modifications of the overrunning clutch of the invention may be made without departing from the spirit or scope thereof and it is to be understood that the invention is intended to be limited only as defined in the appended claims.

What I claim is:

1. An overrunning clutch (1) provided with a bushing (2) which is open at one end and partially closed at a second end and into which are inserted firstly a cage (5) serving to guide latching needles (3) and comprising at least one flange and clutch springs (4), and secondly a slide ring (6) arranged on one end of the cage (5), the bushing (2) overlapping the cage (5) and the slide ring (6), characterized in that, to enable a non-destructive disassembly of the overrunning clutch (1) and re-usability of individual components, the flange (9) of the cage is positively and releasably coupled with the bushing (2) via a snap engagement (7,7d) which comprises retaining elements (8,8d) which are arranged on the flange (9) of the cage (5) and engage a flange (13) of the bushing (2) or a substantially closed bottom (14) of the bushing (2).

2. An overrunning clutch of claim 1 wherein the cage (5) has flanges (9, 10, 10a to 10d) on both sides of the latching needles.

3. An overrunning clutch of claim 1 wherein at a second front end of the bushing (2) which comprises the mounting aperture (48) and is situated opposite the flanges (13, 13d) of the bushing (2), the slide ring (6a to 6d) bears against the flange (10, 10a to 10d) of the cage (5).

4. An overrunning clutch of claim 3 wherein a sintered ring which is fitted into the bushing (2) constitutes the slide ring (5, 6a to 6d).

5. An overrunning clutch of claim 3 wherein the slide ring (6, 6a to 6d) is releasably fixed in the bushing (2) of the clutch (1).

6. An overrunning clutch of claim 3 wherein the flange (10, 10a, 10b) at the mounting aperture (48) is provided with a shoulder (19, 19a, 19b) which bridges a circular ring-shaped space between the slide ring (6, 6a, 6b) and the bushing (2) and overlaps the slide ring (6, 6a, 6b) radially and axially.

7. An overrunning clutch of claim 1 wherein the shoulder (19, 19a, 19b) is provided in an end region with snap lugs (20) which are oriented radially inward in the direction of the longitudinal axis (18) of the clutch (1) and fitted into a chamber (24, 24a, 24b) on the slide ring (6, 6a, 6b).

8. An overrunning clutch of claim 6 wherein the shoulder (19, 19a, 19b) has several integrally formed portions (21, 21a, 21b) projecting radially from its outer circumference and extending over the entire axial width thereof.

9. An overrunning clutch of claim 6 wherein a free end region of the shoulder (19, 19a, 19b) is provided with several axially extending recesses (21, 21a, 21b).

10. An overrunning clutch of claim 1 wherein the clutch (1) is sealed against leaking lubricant and intruding contaminants.

11. An overrunning clutch of claim 1 wherein an opening for lubricant transfer between a latching needle cavity (27) and the slide ring (6, 6a to 6d) is formed in the flange (10, 10a to 10d) which is directed towards the mounting aperture (48).

12. An overrunning clutch of claim 1 wherein the bushing (2) is formed without chip removal and has torque transmission means integrally formed without chip removal on its outer surface.

13. An overrunning clutch of claim 1 wherein the clutch springs (4) have a geometric form corresponding to the letter J and are integrally formed by injection molding axially onto the flange (9) situated opposite the mounting aperture (48), said clutch springs (4) extending into free spaces (51) of the cage (5), and free ends and angularly bent short legs (49) of the clutch springs (4) bear against the latching needles (3).

14. An overrunning clutch of claim 1 wherein the cage (5, 5c) is a one-flange cage with flange (6c) and retaining elements (8).

15. An overrunning clutch of claim 1 wherein the cage (5d) is made in one piece with the flange (6d) and the retaining elements (8), and the flange (6d) is simultaneously designed as a slide ring.

16. An overrunning clutch of claim 1 wherein the retaining elements (8,8d) extend substantially axially towards the flange (13,13d) of the bushing (2), and cams (11,11d) are provided on ends of the retaining elements (8,8d) to engage in the installed position behind a region of the flange (13) situated opposite the mounting aperture (48).

17. An overrunning clutch of claim 16 wherein the cams (11) directed radially outward protrude into a peripheral grove in the flange (13) which is situated opposite the mounting aperture (48).

18. An overrunning clutch of claim 16 wherein the cams (11) directed radially outward protrude into local recesses (12) which is situated opposite the mounting aperture (48).

19. An overrunning clutch of claim 16 wherein cams (11d) are directed radially in the direction of the longitudinal axis (18) of the clutch (1), the bottom (14) of bushing (2) is arched inwardly in the direction of the cage (5).

20. An overrunning clutch (31) provided with a bushing which is open at one end and into which are inserted firstly a cage (35) serving to guide latching needles (33) and comprising at least one flange and clutch springs (34), and secondly a slide ring (36), the bushing (32) overlapping the cage (35) and the slide ring (36), characterized in that the bushing (32) comprises a closed bottom (47) at one front end located opposite a mounting aperture (48), and the cage is axially fixed by the slide ring (36) which is releasably inserted in the bushing (32) to enable a non-destructive disassembly of the overrunning clutch (31) and re-usability of individual components, and a cylindrical portion of the bushing (32) having a smooth outer peripheral surface which has a thinner wall-thickness than the bottom (47).

21. An overrunning clutch of claim 20 wherein the cage (35) has flanges (39,40) on both sides of the latching needles (33).

22. An overrunning clutch of claim 20 wherein at a second front end of the bushing (32) which comprises the mounting aperture (48) and is situated opposite the bottom (47) of the bushing (32), the slide ring (36) bears against the flange (40) of the cage (35).

23. An overrunning clutch of claim 22 wherein a sintered ring which is fitted into the bushing (32) constitutes the slide ring (36).

24. An overrunning clutch of claim 23 wherein the slide ring (36) is releasably fixed in the bushing (32) of the clutch (31).

25. An overrunning clutch of claim 20 wherein the clutch (31) is sealed against leaking lubricant and intruding contaminants.

26. An overrunning clutch of claim 20 wherein an opening for lubricant transfer between a latching needle cavity (27) and the slide ring (36) is formed in the flange (40) which is directed towards the mounting aperture (48).

27. An overrunning clutch of claim 20 wherein the bushing (32) is formed without chip removal and has torque transmission means integrally formed without chip removal on its outer surface.

28. An overrunning clutch of claim 20 wherein the clutch springs (34) have a geometric form corresponding to the letter J and are integrally formed by injection molding axially onto the flange (39) situated opposite the mounting aperture (48), said clutch springs (34) extending into free spaces (51) of the cage (35), and free ends and angularly bent short ends (49) of the clutch springs (34) hear against the latching needles (33).

* * * * *